United States Patent [19]

Beranek et al.

[11] Patent Number: 4,700,340

[45] Date of Patent: Oct. 13, 1987

[54] METHOD AND APPARATUS FOR PROVIDING VARIABLE RELIABILITY IN A TELECOMMUNICATION SWITCHING SYSTEM

[75] Inventors: Allen J. Beranek, Wheaton; David G. Furchtgott, Oak Park; Tuan B. Tu, Naperville, all of Ill.

[73] Assignee: American Telephone and Telegraph Company, AT&T Bell Laboratories, Murray Hill, N.J.

[21] Appl. No.: 865,268

[22] Filed: May 20, 1986

[51] Int. Cl.⁴ .......................... H04J 1/16; H04J 3/14
[52] U.S. Cl. ...................................... 370/16; 370/60; 371/8; 340/825.01
[58] Field of Search .............. 370/16, 60, 94, 58; 371/8, 11; 340/825.01; 379/10, 11, 112, 113

[56] References Cited

U.S. PATENT DOCUMENTS

| | | | |
|---|---|---|---|
| 3,665,173 | 5/1972 | Bouricius et al. | 371/8 |
| 3,937,936 | 2/1976 | Saporito et al. | 371/8 |
| 4,074,072 | 2/1978 | Christensen et al. | 179/15 |
| 4,146,749 | 3/1979 | Pepping et al. | 179/15 |
| 4,160,127 | 7/1979 | Slana et al. | 370/16 |
| 4,543,651 | 9/1985 | Chang | 370/16 |
| 4,592,048 | 5/1986 | Beckner et al. | 370/60 |
| 4,596,010 | 6/1986 | Beckner et al. | 370/60 |

FOREIGN PATENT DOCUMENTS

| | | |
|---|---|---|
| 15153 | 6/1976 | Australia . |
| 2447660 | 8/1980 | France . |
| 103606 | 6/1979 | Japan . |

OTHER PUBLICATIONS

J. W. Johnson, et al., "Integrated Digital Services on the 5ESS TM System", ISS '84 Florence, May 7-11, 1984, pp. 1-8.

Primary Examiner—Douglas W. Olms
Assistant Examiner—Wellington Chin
Attorney, Agent, or Firm—Peter Visserman

[57] ABSTRACT

In a telecommunication switching system adapted for handling call signaling information and data in packet format, a number of protocol handlers (150) are interconnected by means of a local area network (171,173). A variable number of spares may be available for each group of protocol handlers as defined by a ratio table (400) stored in the memory of the systems control processor (100). The ratio table may be changed from time to time to redefine the ratio of spares to actives for each group. In response to a request to activate an additional protocol handler in a group, the ratio table is consulted and an error message is generated if the activation of an additional protocol handler causes the specified ratio to be exceeded. A logical address is recorded in the memory of the system's control processor (100) for each active protocol handler and in the event of reassignment of protocol handlers, a spare protocol handler is selected and the logical address associated with the priorly active protocol handler is assigned to the selected protocol handler. In addition, the local area network address of the priorly active protocol handler is assigned to the selected spare protocol handler. A data distribution circuit operating under the control of control data selectively distributes data packets from connected communication lines to the active protocol handlers.

17 Claims, 9 Drawing Figures

FIG. I

FIG. 4
RATIO TABLE

| GRP | SPARE | ACTIVE |
|---|---|---|
| PHGP1 | 4 | 12 |
| PHGP2 | 4 | 6 |
| PHGP3 | 0 | 0 |
| PHGP4 | 2 | 0 |
| PHGP5 | 3 | 0 |
| PHGP6 | 8 | 0 |

FIG. 9
DSLG-PH TABLE

| DSL_GRP | PH |
|---|---|
| DSLG00 | PH00 |
| DSLG01 | PH02 |
| DSLG02 | PH01 |
| DSLG03 | PH03 |
| ... | ... |
| DSLG12 | UNASSIGN |
| DSLG13 | UNASSIGN |
| DSLG14 | UNASSIGN |
| DSLG15 | UNASSIGN |
| ... | ... |
| DSLG89 | PH95 |
| ... | ... |
| DSLG94 | UNASSIGN |
| DSLG95 | UNASSIGN |

FIG. 8
PH-DSLG TABLE

| PH | DSL_GRP |
|---|---|
| PH00 | DSLG00 |
| PH01 | DSLG02 |
| PH02 | DSLG01 |
| PH03 | DSLG03 |
| PH04 | SPARE |
| PH05 | SPARE |
| ... | ... |
| PH94 | SPARE |
| PH95 | DSLG89 |

METHOD AND APPARATUS FOR PROVIDING VARIABLE RELIABILITY IN A TELECOMMUNICATION SWITCHING SYSTEM

TECHNICAL FIELD

The invention relates to telecommunication switching systems, and particularly, to fault tolerant switching systems.

BACKGROUND OF THE INVENTION

Modern telecommunication systems are equipped to reliably handle a variety of telecommunications traffic. In one arrangement, known as the Integrated Services Digital Network (ISDN) both voice and data are switched in digital form. Call signaling information such as origination signaling, dialed digits, etc. is also transmitted in digital form. Data packets containing signaling information or data are transmitted between a subscriber terminal and the switching system via a digital subscriber link, usually over designated channels as specified for ISDN by the International Telegraph and Telephone Consultative Committee (CCITT). Within the switching system, incoming packets are routed to packet switching devices known as protocol handlers which route data packets to circuits that communicate with corresponding peer protocol circuits in the subscriber terminals, using protocols defined for ISDN.

High reliability is customarily achieved in switching system designs by duplicating critical elements. However, ISDN systems will normally include a substantial number of protocol handlers which are complex and expensive units making full duplication of these units very expensive. As an alternative to full duplication, an n+1 sparing design approach has been used in other systems in which one unit (e.g., a time-slot interchange unit or a memory unit) is designated as the spare for N associated active units. With such a design approach, the spare unit is provided with special connections to the associated units and can be controlled to temporarily perform the functions of one of the associated units in case of failure. Such an arrangement is cheaper than full duplication but provides a lesser degree of reliability. For some telecommunications applications, however, a lesser degree of reliability is acceptable. For example, in data communications, lower reliability of the switching equipment can often be tolerated because of extensive error checking and the ability to retransmit incorrectly received data. On the other hand, very high reliability may be required in the case of military voice communications or similar applications where emergency situations may occur. Furthermore, both types of communications, some requiring high reliability and others requiring a lesser degree of reliability, may have to be handled in one switching system. A problem of the prior art is that there is no convenient way of providing spare units, such as protocol handlers, in such a way that the system may be adapted for a variety of reliability needs without a redesign and restructuring of the system.

SUMMARY OF THE INVENTION

An advance in the art is made and problems of the prior art solved by providing a plurality of identical switching circuits including a plurality of spare switching circuits for serving subscriber terminals connected via communication lines and storage for storing a logical address for each active switching circuit, as well as the physical designation of all switching circuits. A data distribution circuit operating under control of control data selectively distributes data packets from the communication lines to the active switching circuits. A system control processor connected to the distribution circuit is responsive to change control signals identifying an active switching circuit, to store the logical address assigned to the identified active circuit in correspondence with a selected spare circuit in the memory of the central processor, thereby designating the latter as an active circuit. The processor further transfers control data to the distribution circuit to control that circuit to distribute data packets to the selected switching circuit which has been designated to be active. Advantageously, in accordance with this invention, system programs may employ logical addresses for the protocol handlers and any reassignment of the physical circuits does not require a corresponding change in system programs.

In one embodiment of the invention, the switching circuits are protocol handlers connected to a local area network and each of the protocol handlers has an assigned local area network address. The processor responds to the change control signals to transfer the network address of the identified active protocol handler to the selected spare protocol handler so that the selected protocol handler may respond to the newly assigned address when it occurs on the local area network. Furthermore, the protocol handlers operate under control of data stored in the protocol handlers to perform protocol handler functions and the processor, in response to the change control signals, transfers to the selected protocol handler the control data which defines the operations of the priorly active protocol handler, whereby the selected protocol handler performs all the functions priorly performed by the priorly active protocol handler.

In accordance with one aspect of this invention, protocol handlers may be divided into groups of protocol handlers, each group having a designated number of spares. The number of spares for each group may be specified to meet reliability objectives which may be different for each group. A maximum number representative of the maximum number of circuits to be assigned to active data handling in order to maintain the desired level of reliability for the corresponding group is recorded as well as a current number representative of the number of circuits actually assigned to active data handling. In response to a control message to assign an additional packet circuit to packet handling, the current number and the maximum number are compared and an error message is generated if the current number is not less than the maximum number in order to maintain the desired level of reliability for the group. If the current number is less than the maximum number, one of the spare circuits is selected and a logical address is entered in the list in correspondence with the selected spare circuit. Additionally, control data is transferred to the selected circuit defining the packet switching functions and a specified local area network address is assigned to the circuit. In one embodiment, data is distributed from incoming lines to the protocol handlers by means of a data distribution circuit which operates under control of control data stored therein. When a spare protocol handler is activated, the control data of the distribution circuit is altered to direct incoming packets from certain of the lines to the newly activated protocol handler.

Advantageously, the ratio of active to spare protocol handlers for each group is directly controllable by a system administrator who may define the number of spares for each group as desired to meet reliability objectives. Furthermore, the ratio may be changed from time to time to meet varying reliability objectives. Additionally, the ratio of active to spare protocol handlers for each group may be altered without changes in hardware connections or call processing software sequences.

In one embodiment of the invention, the protocol handlers establish communications protocols with subscriber terminals and the terminal identification of each terminal in communication with the system is recorded and a reassignment of protocol handlers includes transferring the terminal identification to the selected protocol handler. Advantageously, this allows the newly activated protocol handler to reestablish signaling channel communications using the terminal identification while preserving existing calls and without interfering with corresponding voice or data channel communications.

BRIEF DESCRIPTION OF THE DRAWING

The invention may be better understood from the following detailed description of an illustrative embodiment of the invention, taken together with the drawing in which:

FIG. 4 is a ratio table stored in the memory of the switching module processor of FIG. 1;

FIG. 8 and 9 list the physical designations of protocol handlers and logical addresses.

DETAILED DESCRIPTION

Figure 1:
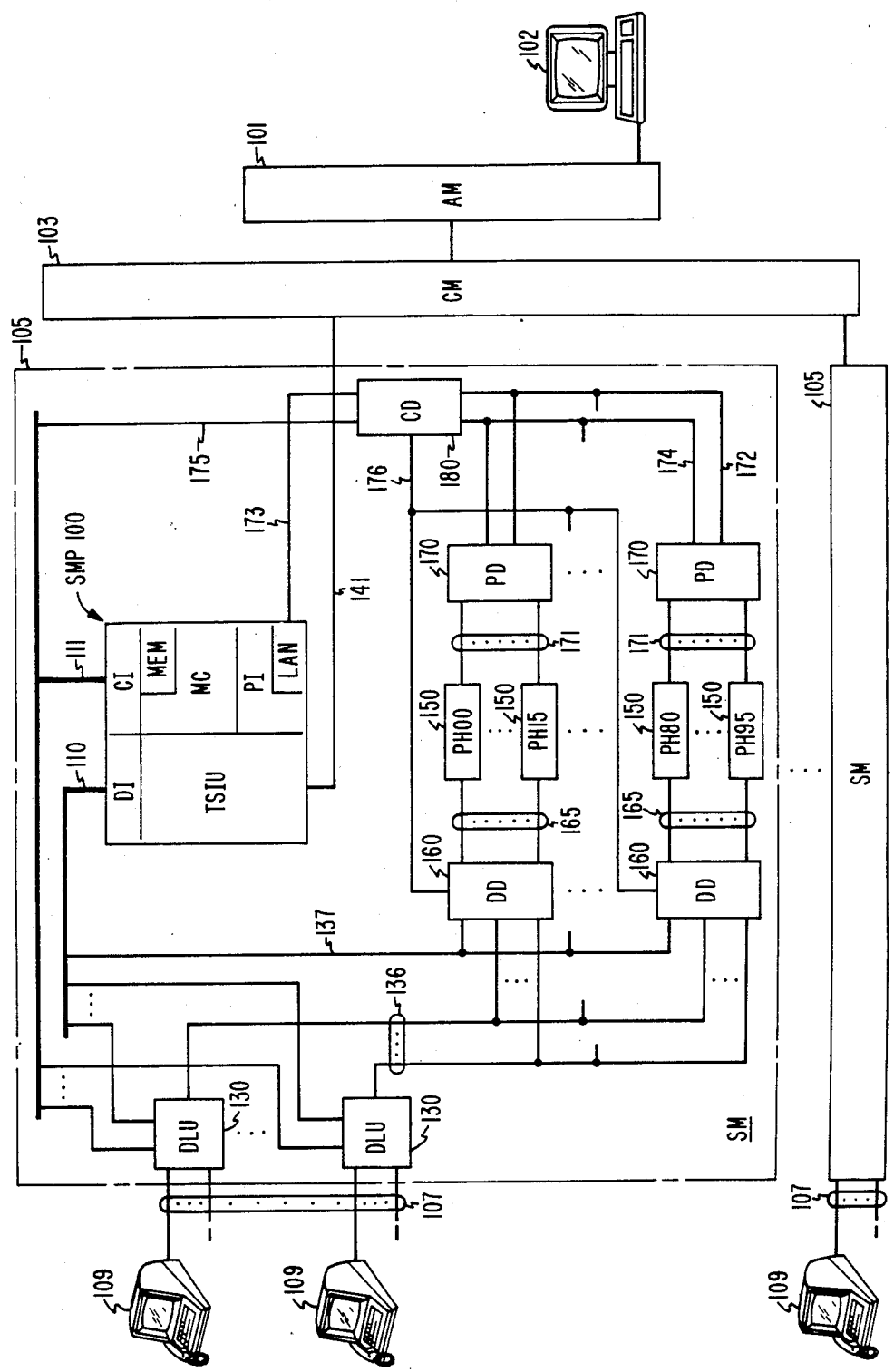
FIG. 1 is a block diagram representation of a telecommunication switching system incorporating the principles of this invention.

FIG. 1 is a block diagram representation of an illustrative telecommunication switching system incorporating the principles of the invention. The system may be a digital telecommunication system of the type which is well known in the art such as, for example, the AT&T Company 5ESS TM switch described in the *AT&T Technical Journal,* July-Aug. 1985, Vol. 64, No. 6, Part Two. Certain details of that system, specifically adapted for ISDN, are disclosed in the allowed applications of Beckner et al. Ser. No. 606,937 entitled "Integrated Packet Switching and Circuit Switching System using PSIU for Switching Call Control and Data Packets" and Ser. No. 606,751 entitled "Distributed Packet Switching Arrangement Interconnecting PSIUs for Inter-Module Packet Calls" assigned to the assignee of the present application. Shown in FIG. 1 is a basic switch architecture. This includes an administrative module 101 which performs system level functions such as common resource allocation in addition to collecting billing data and providing external access to the system via a craft interface terminal 102. The administrative module 101 is connected to a communication module 103 which in turn is connected to a plurality of switching modules 105. The basic function of the communication module is to provide communications between the various switching modules and between the administrative and switching modules. It also provides appropriate synchronization signals to the switching modules. The specific functions and structure of the administrative module 101 and the communication module 103 are not relevant to an understanding of the invention and are not described in detail herein. For the purposes of this description, the modules 101 and 103 may be any structure capable of performing the switching system related functions outlined above.

Each of the switching modules 105 shown in FIG. 1 is identical and connects to a group of input/output communication lines 107, which may be subscriber lines or interconnecting trunk circuits to other switching systems. The subscriber lines 107 may be connected to subscriber stations 109 which in this illustrative example are subscriber stations capable of handling both voice and data in the formats specified for the Integrated Services Digital Network (ISDN). The subscriber stations 109 communicate with the connected switching module 105 over the communication lines 107. In this illustrative system these are digital subscriber lines capable of simultaneously handling voice and data as prescribed for ISDN by the International Telegraph and Telephone Consultative Committee (CCITT). Such a digital subscriber line will have at least two 64 kilobits per second B-channels for transporting voice and/or data and a separate 16 kilobit per second D-channel for transporting data and signaling information in data packet format.

Included in FIG. 1 is a more detailed block diagram of the structure of one of the switching modules 105. A typical system will have several such switching modules, for example 10 or more. All of the switching modules 105 are assumed to be identical in structure and function. The switching module 105 comprises a plurality of known digital line units 130, for example 8 such units, with each line unit terminating a number of digital communication lines 107, for example 512. The digital line unit 130 separates the B-channels from the D-channel for each communication line. The B-channels are transmitted via a data bus 110 to a time-slot interchange unit TSIU incorporated in a switching module processor 100. The time-slot interchange unit is a well-known device which, under control of a control data, performs a switching function. Information is switched by this unit either to digital line units within the same switching module 105 via bus 110 or to the communication module 103 via bus 141 for transfer to another one of the switching modules 105. The digital line units 130 direct the D-channel information, which is in the form of packetized data, via data buses 136 to data distribution circuits 160. There may be several such data distribution circuits, each connected to a plurality of protocol handlers 150 via a corresponding plurality of data buses 165. In this illustrative arrangement, the switching module 105 has six data distribution circuits each connected to a group of 16 associated protocol handlers. The numbers of these units to be used is a matter of design choice depending upon anticipated traffic loads. Buses 136 represent connections from any of the digital line units 130 to any of the data distribution circuits 160. Bus 137 provides a data path to data bus 110 and the time slot interchange unit in processor 100.

In the present arrangement each group of 16 protocol handlers is connected to a packet distribution circuit 170 by means of a local area network. The packet distribution circuit is essentially an arbiter which provides access to the local area network for each of the buses connected thereto on a rotating basis. In this manner, it allows for local area network connections between protocol handlers connected to the same packet distribution circuit and to protocol handlers of other packet distribution circuits 170. Two buses, local area network bus 172 and control bus 174, connect the packet distribution circuits 170 to a control distribution circuit 180. This circuit is essentially an arbiter providing connection from a local area network bus 173, connected to the switching module processor 100, to bus 172 and from control bus 175 to bus 174. The control distribution circuit 180 also provides connection from control bus 175 to a control bus 176, interconnecting the control distribution circuit 180 with each of the data distribution circuits 160. A control bus 111, connected to control interface CI in the switching module processor 100, interconnects the switching module processor 100 with the digital line units 130 and control bus 175. Data bus 110, connected to a data interface DI in processor 100, interconnects the processor 100 with data distribution circuits 160 and the digital line units 130. The local area network buses 172 and 173 provide a path for data packets to be transmitted from protocol handlers to the switching module processor and to other protocol handlers in the same switching module. The protocol handlers will process both call signaling information and data packets and selectively transfer the data to the processor 100 or other protocol handlers.

The switching module processor 100 includes a packet interface PI incorporating a known local area network bus circuitry. The processor further includes a module controller MC, which may for example, be a Motorola 68000 processor and associated memory. A craft terminal 102 connected to the administrative module 101 provides access via the communication module 103 and the time-slot interchange unit TSIU to module controller MC and the switching module processor 100. This craft interface may be used by a system administrator to send commands to the processor 100. One such command may be to assign a spare protocol handler to serving subscribers or to switch the functions of an active to a spare protocol handler. The craft terminal is also used to change system parameters in the switching module processor such as the desired number of spares for each group of protocol handlers.

Figure 2:
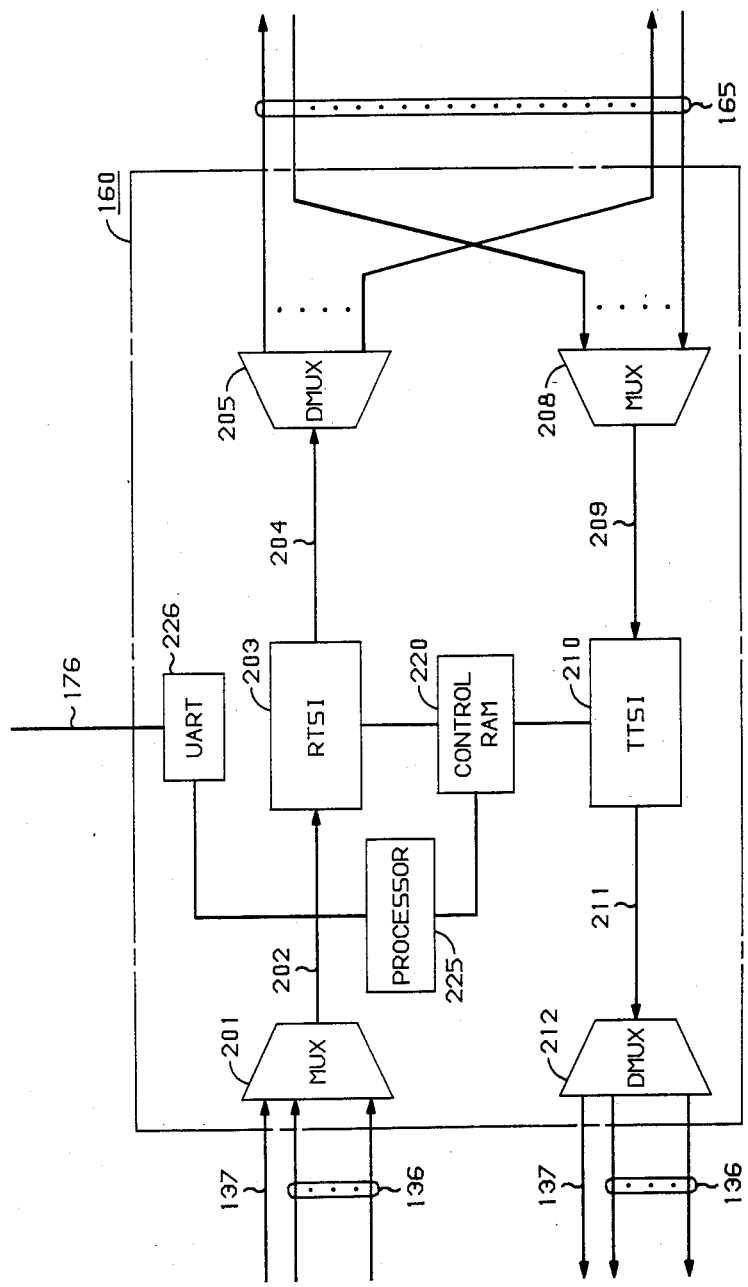
FIG. 2 is a block diagram representation of a data distribution circuit used in the system of FIG. 1.

FIG. 2 is a block diagram representation of one of the data distribution circuits 160, all of which are identical. The data distribution circuit 160 receives data packets from bidirectional data buses 136 and 137, each of which in this illustrative system is a time division bus comprising 32 channels. A well-known multiplexer circuit 201 multiplexes the channels into a single data stream which is applied to a receive time-slot interchange unit 203. The output of the time-slot interchange unit 203 is applied to a demultiplex circuit 205 which distributes data packets to the 16 separate data buses 165 connected to 16 associated protocol handlers. In a similar fashion, data packets from the protocol handlers are multiplexed by the multiplex circuit 208 onto interconnecting bus 209 and transmitted to a transmit time-slot interchange unit 210. The output of this time-slot interchange unit is applied to demultiplex circuit 212 via interconnecting bus 211. The time-slot interchange units 203 and 210 are controlled by means of a control memory 220, which may be a standard random access memory which controls the time-slot interchange units in a well-known fashion. As will be apparent to those familiar with circuitry of this type, the multiplex and demultiplex circuits with interposing time-slot interchange units allow any channel of the buses 136 and 137 to be routed to any protocol handler via bus 165. Similarly, the output of the protocol handlers may be routed to any channel of these buses. The control memory 220 may be updated in a well-known fashion by means of a microprocessor 225. This microprocessor responds to commands from the switching module processor 100 which are transmitted via control bus 176. A standard universal asynchronous receiver/transmitter 226 provides the appropriate interface between microprocessor 225 and the control bus 176 in a well-known fashion.

Figure 3:
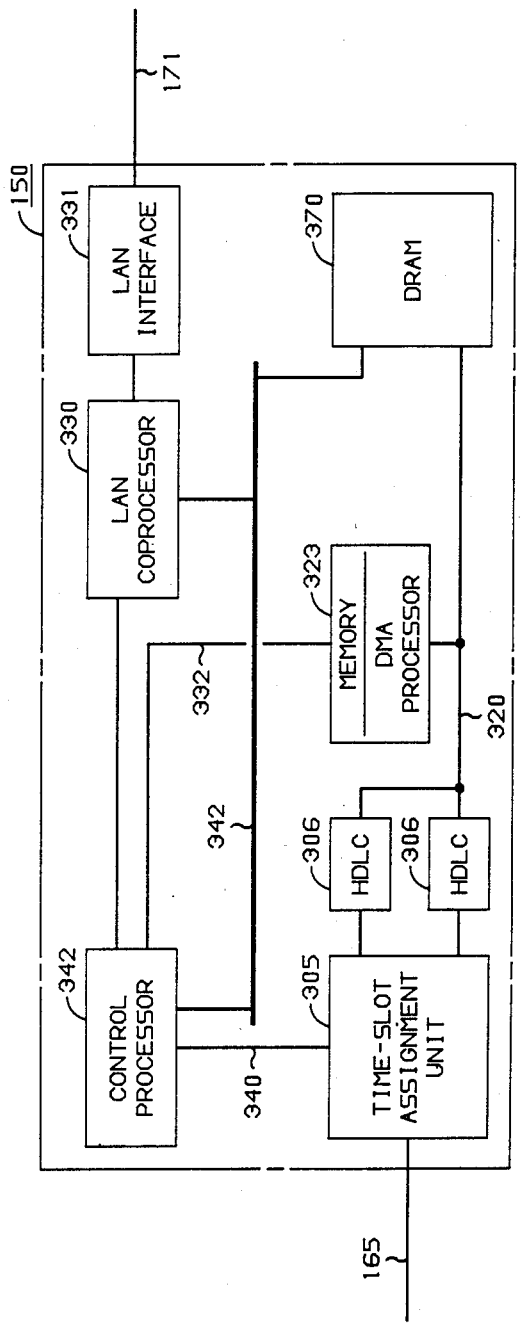
FIG. 3 is a block diagram representation of a protocol handler used in the system of FIG. 1.

FIG. 3 shows one of the protocol handlers 150, all of which are identical, in greater detail. It includes a time-slot assignment unit 305 which, under control of control data stored therein, provides an interface between the time division bus 165 and a plurality of standard high level data link control (HDCL) circuits 306. Each HDLC circuit is used to terminate the HDLC link level protocol from the 16 kilobit per second D channel of one user terminal. In this illustrative arrangement, each protocol handler comprises 32 HDLC circuits. The time-slot assignment unit 305 distributes incoming data words from the bus 165 to the HDLC circuits and transfers outgoing data words from the HDLC circuits to the bus 165.

The protocol handler 150 includes a dual port random access memory (DRAM) 370 and a direct memory access (DMA) processor 323 and a control processor, for example, the INTEL 80186 processor and associated memory. Processor 323 controls the transfer of information via bus 320 between the HDLC circuits 306 and memory 370. A local area network (LAN) co-processor 330, which may be an Intel 82586 processor and associated memory, controls the transfer of information via bus 342 between the local area network interface 331 and memory 370. Control processor 342, which may be an Intel 80186 processor and associated memory, controls the overall operation of the protocol handler 150.

During normal operation, when a protocol handler is actively serving subscriber terminals, incoming data words are routed through the time-slot assignment unit 305 to the HDLC circuits 306. These circuits perform the HDLC link level functions such as bit stuffing, error checking, etc., in a manner well known in the art. The DMA processor 323 scans each of the HDLC circuits 306 to determine when the beginning of a frame of data has been received. Upon determining that an HDLC circuit has received the beginning of a frame, processor 323 selects an available buffer in memory 370. Thereafter, each bit received by the HDLC circuit is transferred via bus 320 to memory 370 in the selected buffer. The address of the selected buffer or buffers is stored in a buffer control block in memory 370 and when a complete frame has been received, the DMA processor 323 sets a bit in an interprocessor communication field in memory 370 which is read by the control processor 342. In response, processor 342 reads the control block and the header of the frame from memory 370 via bus 342. If the header indicates that the frame is a signaling frame, the control processor 342 initiates a transfer of the frame to the switching module processor 100 under control of the LAN coprocessor 330. If, an examination of the frame header in RAM 370 the processor 342 indicates that the stored frame is a data frame, processor 342 consults a routing table to determine the address of the destination protocol handler and effects the transmission of the data frame to the destination protocol handler by mean of LAN coprocessor 330 and the local area network bus 171. The LAN coprocessor 330 operates to transfer incoming packets received on the local area network bus 171 to available buffers in memory 370 in a matter analogous to that of the DMA processor 323. Such received packets are transferred from memory 370 to the HDLC circuits 306 by means of DMA processor 323.

Each of the protocol handlers in a switching module is identified by a physical designation in a table in the memory of the switching module processor 100 referred to as the PH-DSLG table, as depicted in FIG. 8. In this illustrative embodiment, the switching module 105 comprises 96 protocol handlers which are designated in the table of FIG. 8 simply by ph00 through ph95. The memory table further includes a logical address for each active protocol handler and a spare code designation for each nonactive protocol handler. The logical address entered in correspondence with a designated protocol handler identifies the group of digital subscriber lines served by the designated protocol handler. When the switching module processor 100 is first initialized, the physical identity of all protocol handlers is written in this table from the administrative module 101. A system administrator will divide the communication lines connected to each of the switching modules 105 in groups and will assign a logical address to each group of lines expected to produce the traffic customarily served by a single protocol handler. Such information is provided to the administrative module 101 via the interface terminal 102, and will be written in the table of FIG. 8 in the memory of the module processor 100. The logical address is also referred to as a digital subscriber line group identification. Hence, the DSLG designation in the tables of FIGS. 8 and 9. Normally, there will be fewer DSL groups than protocol handlers and a spare code designation is entered in table 800 for each unassigned protocol handler. Depicted in FIG. 9 is another table 900 in the memory of the processor 100, referred to as the DSLG-PH table, which provides a translation from digital subscriber line group number to physical protocol handler number.

As indicated in FIG. 1, the protocol handlers of the switching module 105 are divided into groups of 16, with a data distribution circuit being provided for each group of 16 protocol handlers. A desired ratio of active to spare protocol handlers may be selected for each group of protocol handlers. These ratios are reflected in the ratio table 400 shown in FIG. 4, which is stored in the memory of the module processor 100 and which is written by commands from the system administrator via administrative module 101. The table 400 shows the required number of spares for each group of 16 protocol handlers, thus defining the ratio, and the number of currently active units in each group. This ratio may be altered from time to time under control of the system administrator.

Figure 5:
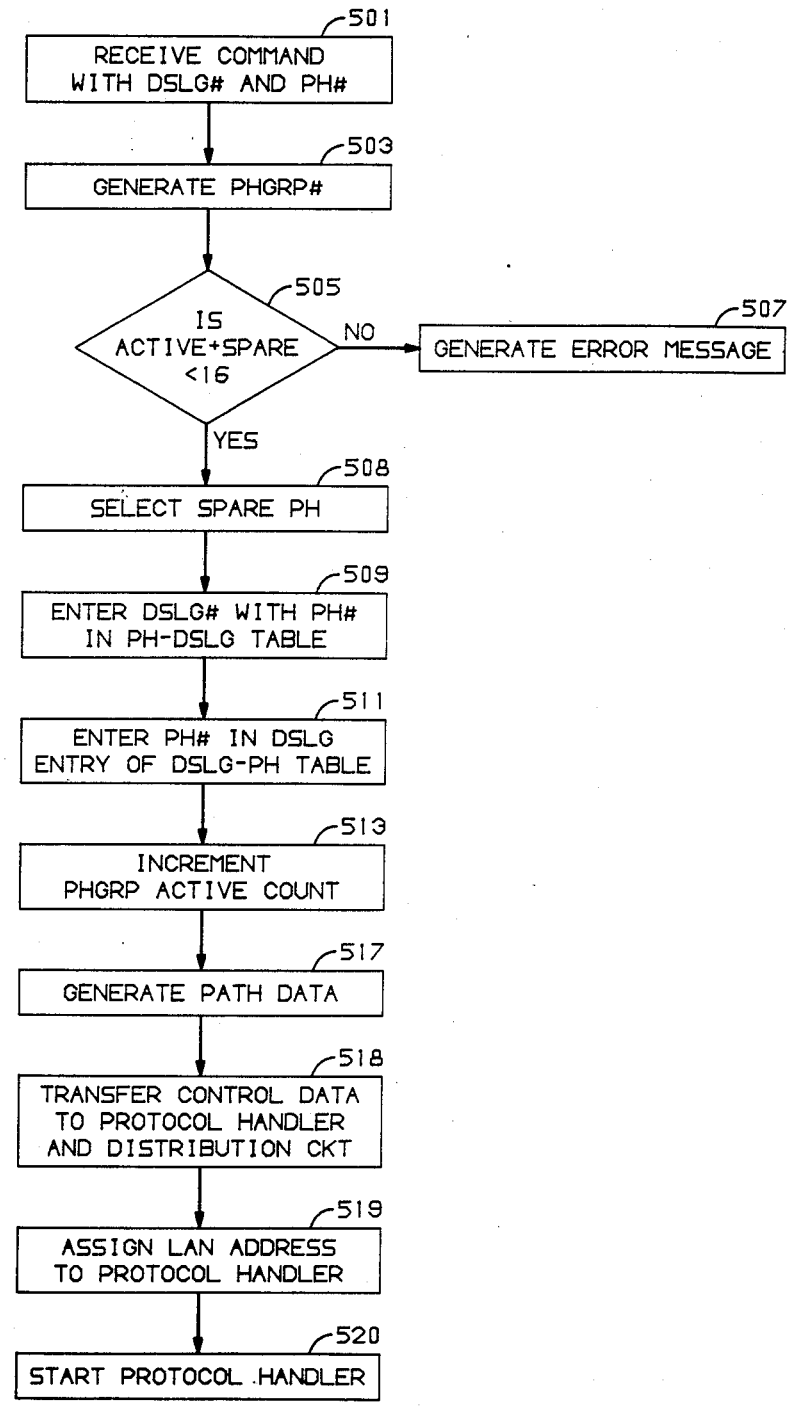
FIG 5 is a flow chart representation of the functions performed by the switching module processor of FIG. 1 in response to one command message.

FIG. 5 is a flow diagram depicting the process of adding a DSL-group to a protocol handler group in response to commands from the system administrator via craft interface 102. The first step in this process is outlined in block 501 and consists of receiving the command message specifying the digital subscriber line group number and the communication lines included in the group. Subsequently, in block 503 a protocol handler group number is derived from the received digital subscriber line group number. The protocol handlers are divided into groups of 16, and are numbered sequentially from 0 to 95 in each switching module 105. DSL groups are similarly numbered between 0 and 95, and each block of 16 DSL group numbers is associated with a correspondingly numbered group of protocol handlers. For example, DSL group numbers 0 through 15 are associated with ph00 through ph15 which belong to the first group, DSL group numbers 16 through 31 are associated with ph16 through ph31 which belong to the second group of protocol handlers, etc. After generation of the group number in block 503, the corresponding entry is read from the table 400 defining the number of active and spares in the group. As stated, each group includes 16 protocol handlers. Therefore, the number of spare protocol handlers plus the number of active protocol handlers cannot exceed 16. In block 505 a test is made to determine whether the sum of the spares and the active recorded in table 400 for the particular group is less than 16. If not, the assignment of an additional group of lines to this particular group of protocol handlers will exceed the desired level of reliability expressed by the ratio in FIG. 4. Consequently, an error message is generated in block 507. When the sum of the active and spare units of a group is less than 16, an advance is made to block 508 where a next available spare protocol handler is selected in the group of protocol handlers identified in block 503. Therefore, an advance is made to block 509 where the received digital subscriber line group number is entered in the PH-DSLG table 800 in correspondence with the selected protocol handler. Subsequently, in block 511 the selected protocol handler identity is entered in the DSLG-PH table 900 in correspondence with the received digital subscriber line group number. In block 513 the number in the table 400 representing active protocol handlers in the affected protocol handler group is incremented by one. Alternatively, instead of recording the active protocol handlers in each group and incrementing that number, the active to current spare ratio could be computed from table 800 each time before making the test in block 505. In block 517, path data is generated in a standard manner defining the communication path from the communication lines 107 to the protocol handlers. This includes control data for the data distribution circuit 160 and for the selected protocol handler. In block 518 the control data is transferred to data distribution circuit 160 via control bus 176 and to the protocol handler via the local area network bus using a standard multicast addressing mode. In the multicast method, data is broadcast to all units on the local area network bus. Each unit reads only a specified portion of the data word and responds accordingly. Thereafter, in block 519, a local area network address corresponding to the received digital line group number is assigned to the specified protocol handler. Such assignment may be made by means of a translation table, which is consulted each time before a protocol handler is addressed, translating the assigned logical address into a protocol handler identity. In this illustrative embodiment, a new local area network address is assigned to a protocol handler by transmitting a data message to the specific protocol handler using the standard multicast method. This message specifies the new address to which the protocol handler is to respond henceforth. Such a message will be received, for example, by the control processor 342 which will cause the address to be written in the LAN coprocessor 330 causing the coprocessor to respond only to such address thereafter. Subsequent to the action of block 519, in block 520, a control message is sent to the specified protocol handler enabling the protocol handler to start processing data.

Figure 6:
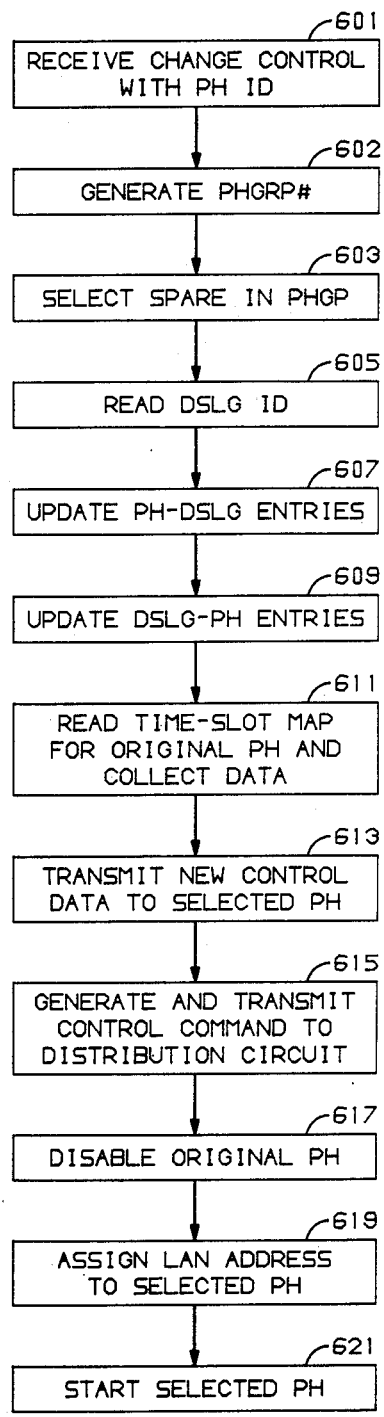
FIG. 6 is a flow chart representation of functions performed by the system in response to another command message.

A protocol handler may be switched out of service by change control command messages to the switching module processor 100. This can be done in response to commands from the craft interface 102 or from system programs internal to processor 100. Such a message need only specify the identity of the protocol handler to be replaced. The process for accomplishing such a change is outlined in flow chart form in FIG. 6. The first step taken by the processor 100 in this process is receiving the protocol handler number as indicated in block 601. As stated earlier, in this illustrative system the 96 protocol handlers are grouped in 6 groups of 16 each, and a spare must be found in the group to which the identified protocol handler belongs. In block 602, the protocol handler group number is generated based on the received protocol handler identity. In block 603, a spare protocol handler is selected from the group of 16 defined by the group number generated in block 602. The PH-DSLG table 800 is consulted in block 605 to obtain the digital subscriber line (DSL) group number entered therein in correspondence to the received protocol handler identity. Next, in block 607, this digital subscriber line group identity is entered in the place in the PH-DSLG table 800 corresponding to the spare protocol handler selected in block 603. In block 609 the DSLG-PH table 900 is updated by entering the identity of the spare protocol handler in the space in table 300 corresponding to the DSLG-ID obtained in block 605. This table 900 is used by system programs in associating a logical address of a subscriber line to a physical protocol handler. Updating of this table allows a change to be made in the protocol handlers without a need for modification of call processing software. Any actions which the call processing programs take with respect to the effected digital subscriber line group will subsequently be applied to the protocol handler which has been selected to replace the protocol handler identified by the ID received in block 601. A fault diagnosis program need only identify a fault protocol handler by its logical address, which can be readily translated to a physical identity using table 900.

Figure 7:
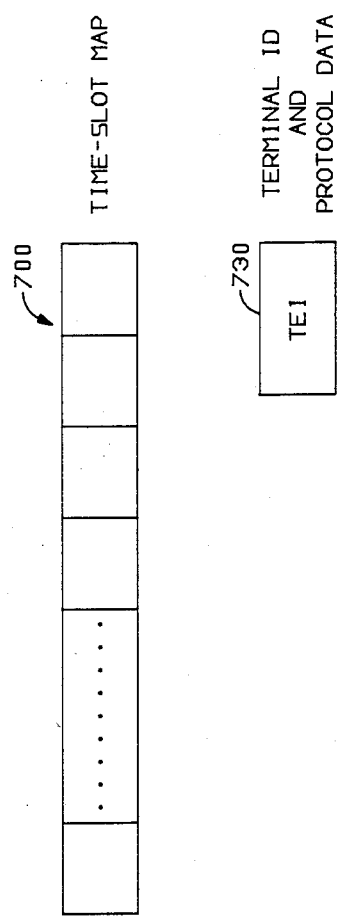
FIG. 7 shows memory storage areas for storing protocol related data.

With the identity of the original protocol handler which is to be removed and the identity of the spare protocol handler which is to be activated, a physical rearrangement can be made to effect the change. A number of functions must be performed. One function is the change of the control information in the affected data distribution circuit 160. The data distribution circuit 160 comprises basically a time-slot interchange unit which switches data bits received from the digital line units 130 to the data buses 165 interconnecting the data distribution circuit 160 and the protocol handlers 150 associated with this circuit. Thus, in this case, the time-slot interchange unit must be updated to switch data associated with lines in the identified line group to the selected protocol handler instead of the original protocol handler. To accomplish the change, a control command must be sent from the control processor to the data distribution circuit ordering the data distribution to update the contents of control RAM 220 to effect this change. As depicted in block 611, pertinent information for generating the control command is obtained by means of a time-slot map 700 in the memory of switching module processor 100 shown in FIG. 7. This map indicates all time slots which are active on the data bus between the data distribution circuit 160 and the original protocol handler identified in block 601. The identity of one of the active time slots is used to address a corresponding TEI table 730 shown in FIG. 7. These tables provide information including the identity of D channels served in the time-slots, as well as data port and terminal identification for each of the active terminals associated with the original protocol handler.

Additionally, the newly selected protocol handler must be provided with the appropriate data to perform the protocol handler functions with respect to the newly assigned subscriber line group. The information is derived from the data obtained in block 611 from the data structure of FIG. 7 stored in the memory of processor 100. The information is transmitted from the switching module processor 100 to the selected protocol handler by means of the local area network bus using a standard multicast address. This is depicted in block 613. Alternatively, the protocol handler control data, which is also stored in the original protocol handler, could be transferred from the original protocol handler to the spare via the local area network. Subsequent to the action of block 613, a control command to cause the distribution circuit to steer data packets to the newly selected protocol handler is transmitted to the appropriate distribution circuit via control bus 176, as depicted in block 615. In block 617 a control message may be transmitted via the local area network to the original protocol handler to disable that protocol handler. Alternatively, this may be done by a reset control lead (not shown) from the control processor 100 to each of the protocol handlers. In block 619 the local area network address, which was assigned to the original protocol handler, is assigned to the newly selected protocol handler. In this illustrative system, such assignment is accomplished by transmitting a control message on the local area network by means of a multicast address. This control message causes the new address to be entered in the LAN coprocessor 330 causing the coprocessor to respond to that address thereafter. Subsequently, in block 621, a control message is sent out to the selected protocol handler to enable the protocol handler to begin to serve the subscriber lines previously served by the original protocol handler. A part of starting the selected protocol handler is re-establishing protocol with the terminals identified by the data transmitted in block 613 and beginning to perform link level functions in a known manner. As outlined above, during this rearranging of protocol handlers, all of the information with respect to the communicating terminals is retained and none of the circuit switched B channel calls are lost or otherwise accidentally terminated.

It is to be understood that the above described arrangement is merely illustrative of the application of the principles of the invention; numerous other arrangements may be devised by those skilled in the art without departing from the spirit and scope of the invention described herein. It is therefore intended that such change of modifications be covered by the following claims.

What is claimed is:

1. A telecommunication switching system arranged for handling data packets comprising:
   a plurality of line interface circuits connectable to communication lines;
   a group of identical protocol handlers for processing data received from communication lines including a plurality active protocol handlers and a plurality of spare protocol handlers;
   a system control processor including a memory for storing the identity of each of the protocol handlers of said group and for storing a logical address in correspondence with each of the active protocol handlers and a spare code designation in correspondence with each of the spare protocol handlers;
   a distribution circuit connected to said interface circuits and said protocol handlers including means for storing control data and operative under control of said control data to selectively distribute data received from communication lines connected to said interface circuits to said active protocol handlers;
   communication bus means interconnecting said processor and said distribution circuit;
   said processor being responsive to command control signals including a specified logical address to select one of said spare protocol handlers and to store said specified logical address in said memory in correspondence with said selected spare protocol handler, and to transfer control data to said distribution circuit for controlling said distribution circuit to distribute data from said line interface circuits to said selected spare protocol handler.

2. The system in accordance with claim 1, wherein said processor and said protocol handlers are connected to a local area network and wherein each of said active protocol handlers has an assigned network address, and wherein said processor is further responsive to said command control signals to assign the network address previously assigned to the protocol handler corresponding to said specified logical address, to said selected spare protocol handler.

3. The system in accordance with claim 2 wherein said network address is said specified logical address, and each active protocol handler comprises means responsive to a network address, transmitted on said local area network, corresponding to a logical address stored in said memory.

4. The system in accordance with claim 2, wherein each of said protocol handlers comprises means for storing protocol control data and means responsive to said protocol control data to control protocol handler operations and wherein said processor means is responsive to said command control signals to transfer protocol control data defining operations for said active protocol handler corresponding to said specified logical address, to said selected spare protocol handler for storage in said means for storing protocol control data of said selected spare protocol handler.

5. In a telecommunication switching system having a plurality of packet switching circuits connectable to system input/output lines for handling digital information in data packet format and means for generating control messages, the method comprising the steps of:
   a. creating a list including a physical designation for each packet switching circuit of said plurality and a corresponding logical address designation for each circuit of said plurality assigned to packet handling and a corresponding spare code designation for all other circuits of said plurality;
   b. recording a minimum number representative of the minimum number of said plurality of circuits to be designated as spare circuits in order to maintain the desired level of reliability;
   c. in response to a first control message to activate one of said other circuits: computing the number of circuits having a spare code designation in said list; comparing said computed number and said minimum number and generating an error message if said computed number is not greater than said minimum number, and if said computed number is greater than said minimum number, entering a logical address in said list in correspondence with one of said other circuits of said plurality, and establishing data paths between said input/output lines and said one of said other circuits;
   d. in response to a second control message identifying one of said circuits: disabling said identified circuit, selecting one of said other circuits, and establishing a data path between said input/output lines and said selected circuit.

6. In a telecommunication switching system comprising of a plurality of switching circuits connectable to input/output lines and means for generating control messages, a method of interchanging switching circuits comprising the steps of:
   a. creating a list including a physical designation for each switching circuit of said plurality, a corresponding logical address for each of said circuits actively assigned to performing switching functions and a corresponding spare code designation for all other circuits of said plurality;
   b. responding to a control command identifying one of said circuits by:
      1. selecting one of said circuits having a corresponding spare code designation in said list,
      2. entering the logical address corresponding to said identified circuit in correspondence with said selected circuit in said list,
      3. transferring to said selected circuit, control data defining switching operations of said identified circuit,
      4. disabling said identified circuit,
      5. establishing a data path from input/output lines served by said disabled circuit to said selected circuit, and
      6. enabling said selected circuit to perform switching functions.

7. The method in accordance with claim 6, comprising the step of interconnecting said switching circuit by means of a local area network in which each of said circuits responds to a defined address on said local area network, and said step of responding to said control command includes changing said address of said selected circuit to correspond to the address of said identified disabled circuit.

8. In a telecommunication switching system having a plurality of groups of protocol handler circuits connectable to subscriber terminals for processing call signaling information in data packet format received from said terminals, a method of assigning switching circuits comprising the steps of:
   a. creating a list including a physical designation for all of said circuits and including a corresponding logical designation for each of said circuits assigned to serving terminals and a corresponding spare code designation for each of said circuits not assigned to serving terminals;

b. recording for each of said groups a first number indicative of the number of spare circuits required to maintain a desired level of reliability;

c. responding to a request to assign an additional one of said circuits of a predetermined one of said groups to serving certain subscriber terminals by: computing the number of circuits having a spare code designation in said list for said predetermined group, comparing said computed number and said recorded number and generating an error message if said comparison indicates that the assignment of one of said circuits having a spare code to the serving of subscriber terminals will not maintain the desired level of reliability of said predetermined group, otherwise selecting one of said circuits of said predetermined group having a corresponding spare code designation in said list, entering a logical designation for said selected circuit in said list, and establishing data paths from said certain subscriber terminals to said selected one of said circuits.

9. In a telecommunication switching system having a plurality of protocol handler circuits connectable to subscriber terminals for processing call signaling information in data packet format received from said terminals and establishing protocols, a method of assigning switching circuits comprising the steps of:

a. creating a list including a physical designation for all of said circuits and including a corresponding logical address designation for each of said circuits assigned to serving terminals and a corresponding spare code designation for each of said circuits not assigned to serving terminals;

b. recording the identity of each terminal served by said circuits;

c. responding to a change control command identifying one of said circuits assigned to serving certain of said terminals by: (1) selecting one of said circuits having a corresponding spare code designation in said list, (2) entering the logical address designation corresponding to said identified circuit in said list in correspondence with said selected circuit, (3) transferring control data associated with said identified circuit to said selected circuit, (4) transmitting the recorded identity of said certain terminals to said selected circuit, (5) establishing a connection from said certain terminals to said selected circuit, and (6) enabling said selected circuit to reestablish protocols between said terminals and said switch.

10. The method in accordance with claim 9 wherein said protocol handler circuits are divided into groups and each group of circuits has a unique identity, and said step of responding to change control signals includes the step of identifying the group to which said identified circuit belongs, and said selecting in responding to change control signals comprises selecting a circuit in said identified group.

11. In a telecommunication system comprising means for generating a control message and a plurality of identical switching circuits connectable to input/output lines, certain of said circuits assigned a spare status and a certain of said circuits connected to input/output lines and assigned active status, a method for providing a variable number of spare switching circuits in accordance with a desired level of system reliability, comprising the steps of:

a. recording a number representative of the number of spare switching circuits required in order to maintain the desired level of reliability;

b. in response to a control message to connect an additional one of said switching circuits to input/output lines, computing the number of said circuits assigned active status and generating an error message if the assignment of one of said spare circuits to active status causes the number of spare circuits to fall below the recorded number, otherwise performing the following steps: (1) selecting a spare circuit to be activated, and (2) activating said selected circuit.

12. The method in accordance with claim 11 in a telecommunication switching system wherein the switching circuits are interconnected by means of a local area network and the steps performed if the error message is not generated, include enabling said selected circuit to respond to a network address on said local area network.

13. The method, in accordance with claim 12, in a telecommunication system wherein said switching circuits each comprise means for storing control data defining circuit operations and wherein steps performed if the error message is not generated, include transferring control data defining circuit operations to said selected circuit via said local area network.

14. In a telecommunication switching system comprising means for generating control commands and a plurality of switching circuits, including certain circuits designated as active and actively performing switching functions and a plurality of inactive circuits designated as spares, and the circuits are interconnected by means of a local area network for communication between the circuits, the method of replacing a designated active switch with a spare switch comprising the steps of:

a. creating a list, including a physical designation for each circuit, a corresponding logical address for each active circuit and a corresponding spare code designation for each spare circuit;

b. responding to a control command identifying one of the active circuits by: (1) selecting one of the spare circuits in the list, (2) entering the logical address corresponding to the identified active circuit in the list in correspondence with the selected spare circuit, (3) disabling the identified active circuit, (4) transferring to the selected circuit the local area network address of the disabled circuit, and (5) enabling the selected circuit to respond to the transferred address.

15. The method, in accordance with claim 14, in a system comprising a distribution circuit operating under control of control data for distributing data from subscriber terminals to active switching circuits and wherein the method further comprises the step of transferring control data to the distribution circuit to cause the distribution circuit to transfer data previously designated for the disabled circuit to the selected circuit.

16. The method of claim 14 in a system in which the circuits perform switching functions under the control of control data stored therein, comprising the further step of transferring to said selected circuit control data corresponding to control data stored in the disabled circuit.

17. The method in accordance with claim 16 in a system wherein active circuits communicate with subscriber terminals and the method further comprises the step of recording the identity of each subscriber terminal in communication with active circuits and said step of transferring control data to said selected circuit includes transferring the identity of certain of said terminals arranged to communicate with said disabled circuits, and the further step of enabling said selected circuit to establish communications with said certain terminals.

* * * * *